United States Patent [19]

Houskamp

[11] 4,341,985
[45] Jul. 27, 1982

[54] PROPORTIONAL SPEED CONTROL ARRANGEMENT

[75] Inventor: Robert W. Houskamp, Grand Rapids, Mich.

[73] Assignee: Bell & Howell Company, Chicago, Ill.

[21] Appl. No.: 113,357

[22] Filed: Jan. 18, 1980

[51] Int. Cl.³ .............................................. H02P 3/06
[52] U.S. Cl. .................................. 318/260; 318/386; 180/179
[58] Field of Search ............... 318/139, 259, 260, 386, 318/387, 400; 180/170, 179

[56] References Cited

U.S. PATENT DOCUMENTS

| 3,546,548 | 12/1970 | Wouk | 318/139 |
| 3,563,331 | 2/1971 | Kato | 180/179 |
| 3,716,767 | 2/1973 | Kuriyama et al. | 318/139 |
| 3,878,915 | 4/1975 | Purland et al. | 180/170 |
| 4,138,723 | 2/1979 | Nehmer et al. | 180/179 X |
| 4,265,337 | 5/1981 | Dammeyer | 180/170 |

Primary Examiner—Gene Z. Rubinson
Attorney, Agent, or Firm—Varnum, Riddering, Wierengo & Christenson

[57] ABSTRACT

A proportional speed control arrangement (100) is disclosed for use with vehicles requiring variable velocities of operation. Specifically, the arrangement is utilized with a traction motor apparatus (101) to provide velocity adjustments to a service type of vehicle via electronic circuitry responsive to signals generated from an interface controller (102). The interface controller (102) comprises acceleration switches (KI, KD) and an enabling switch (KE) which are responsive to activation thereof by external means to establish velocity command signals. The velocity command signals control the application of energizing signals to the motor apparatus. A requisite velocity is maintained by deactivation of the acceleration switches while correspondingly maintaining activation of the enabling switch.

26 Claims, 7 Drawing Figures

PROPORTIONAL SPEED CONTROL ARRANGEMENT

FIELD OF THE INVENTION

This invention pertains to acceleration control devices and, more particularly, relates to a proportional speed control arrangement for adjusting and maintaining the velocity of self-propelled vehicles.

BACKGROUND OF THE INVENTION

In various types of self-propelled vehicles, such as service vehicles having traction motor apparatus, it is necessary to provide velocity control arrangements for adjusting the speed and direction thereof. Several schemes exist in the prior art which utilize hand-operated control mechanisms mounted on tiller structures coupled electrically and mechanically to the vehicle housing for providing both steering and motion control. However, each of these schemes suffers from limitations not found in the present invention. Many of the prior art control mechanisms provide for unidirectional or bidirectional constant speed motion while others provide for variable speed selection in either one or two directions.

One such exemplary arrangement is disclosed in U.S. Pat. No. 4,113,042, R. E. Vaill, issued Sept. 12, 1978, involving an electrically powered utility vehicle manually controlled by means of a speed selection switch mounted on the handle of the utility vehicle. Rotation of the speed selection switch by a craftperson generates a voltage control signal which is a function of the displacement of the rotation of the switch. A traction motor mounted within the utility vehicle is responsive to the voltage control signal for operating at a speed proportional to the level of the control signal. The rotational speed selection switch comprises a potentiometer having an adjustable resistance whereby the aforementioned voltage control signal is "picked off" of the potentiometer. However, speed control by means of potentiometer apparatus is sluggish in response to positional changes of the rotational switch and provides limited adjustment for loading conditions on the vehicle and traction motor.

A further prior art disclosure is U.S. Pat. No. 3,896,892, J. P. Kohls et al, issued July 29, 1975, wherein a self-propelled vehicle comprises an extendable tiller having a hand grip rotationally operable to regulate speed of the vehicle drive motor. Movement of the hand grip actuates movement of a magnet which controls reed switches for varying the energy applied to the motor of the self-propelled vehicle. Kohls is limited to discrete steps of speed control and requires a shunt relay control path for each discrete step designed therein.

SUMMARY OF THE INVENTION

Advantageously, a technical advance is achieved by a proportional speed control arrangement having activable acceleration switch means and enable switch means for controlling acceleration of a self-propelled vehicle to a desired velocity and maintaining the desired velocity by deactivating the acceleration switch means. An arrangement in accordance with the invention further allows for selection of any of a continuum of speeds while also providing for ease of manual operation via mounting of acceleration and enable switches on opposite surfaces of a mechanical handle structure.

The proportional speed control arrangement is connected to a self-propelled vehicle having motor means for establishing motion thereof. The arrangement comprises an interface means activable by external means for establishing velocity command signals indicative of a desired directional motion of the vehicle. Circuit means are connected to the interface means and to the motor means and are responsive to the activation of the interface means for applying to the motor means energizing signals for causing the vehicle to change from a first velocity to a second velocity. The interface means comprises acceleration switch means and enable switch means wherein the vehicle is adjusted from the first velocity to the second velocity by activation of both the acceleration and enable switch means. The velocity of the vehicle is substantially maintained at the second velocity by deactivation of the acceleration switch means at a time correspondent to the time that the vehicle substantially attains the second velocity.

The circuit means are responsive to the velocity command signals only upon activation of the enable switch means and the motor means are responsive to deactivation of the enable switch means to adjust the magnitude of the velocity of the vehicle to a value substantially equal to zero. The acceleration means comprises a positive acceleration switch means and a negative acceleration switch means, each connected to the control means and selectively activable by the external means for establishing acceleration of the vehicle in forward and reverse directions, respectively. Both the positive and negative acceleration switch means will establish acceleration of the vehicle in corresponding directions only upon activation of the enable switch means.

The velocity command signals comprise a positive acceleration signal established by activation of the positive acceleration switch means and a negative acceleration signal established by activation of the negative acceleration switch means. Further, the velocity command signals comprise an enable signal established by activation of the enable switch means.

The circuit means comprises a command control circuit connected to the interface means and responsive to establishment of the velocity command signals for generating a directional signal having first and second states. The directional signal is established in the first state when the velocity of the vehicle is in a forward direction, and in the second state when the velocity of the vehicle is in a reverse direction. The command control circuit is further responsive to establishment of the velocity command signals for generating an absolute speed signal indicative of the desired speed of the vehicle.

The command control circuit further comprises acceleration control means connected to the interface means and responsive to the state of the directional signal and to activation of the acceleration switch means to adjust the rate of change of the absolute speed signal. Specifically, the acceleration control means is responsive to activation of the positive acceleration switch means and to the directional signal being in the first state for adjusting the rate of change of the absolute speed signal to a first predetermined rate. Further, the acceleration control means is responsive to activation of the negative acceleration switch means and to the directional signal being in the first state to adjust the rate of change of the absolute speed signal to a second predetermined rate wherein the second predetermined rate is greater in magnitude than the first predetermined rate. The acceleration control means comprises a conducting path connected to the acceleration switch means of the interface means. Further, circuit switch means are connected to the conducting path for selectively controlling the magnitude of impedance in the conducting path. Feedback means are connected to the circuit switch means and are responsive to the directional signal for applying control signals to the circuit switch means indicative of the state of the directional signal. The circuit switch means is responsive to activation of the positive acceleration means and to the directional signal being in the first state for establishing the impedance of the conducting path to a first predetermined impedance. Further, the circuit switch means is responsive to activation of the positive acceleration switch means and to the directional signals being in the second state for establishing the magnitude of impedance in the conducting path to a second predetermined impedance wherein the second impedance is greater in value than the first impedance.

The command control circuit further comprises a positive current source connected to the positive acceleration switch means and responsive to activation of the positive acceleration switch means for generating an electrical current to establish the positive acceleration signal. Similarly, a negative current source is connected to the negative acceleration switch means and is responsive thereto for generating an electrical current for establishing a negative acceleration signal. The command control circuit further comprises a voltage holding circuit connected to both the positive and negative current sources and responsive to either the positive acceleration signal or the negative acceleration signal to adjust a holding voltage signal which is indicative of the desired velocity of a vehicle. A voltage clamping circuit is connected to the enable switch means and to the voltage hold circuit and is responsive to activation of the enable switch means to allow the holding voltage at the voltage hold circuit to change in the presence of a corresponding activation of either of the acceleration switch means. Further, the voltage clamp circuit is responsive to the absence of a corresponding activation of either of the acceleration switch means to maintain the holding voltage at the voltage hold circuit. The command control circuit further comprises a polarity sensing circuit connected to the voltage hold circuit and responsive to the holding voltage for generating the directional signal wherein the directional signal is indicative of the polarity of the holding voltage. A rectification circuit is connected to the voltage holding circuit and is responsive to the holding voltage to generate the absolute speed signal wherein the absolute speed signal corresponds to the magnitude of the holding voltage.

The circuit means further comprises a logic circuit means having a relay switch control circuit connected to the command control circuit and responsive to the state of the directional signal for generating a relay control signal. Reverse relay means are connected to the relay switch control circuit and are responsive to the relay switch control signal for operating a relay to reverse the polarity of the energizing signals thereby reversing the direction of motion of the motor means. Acceleration signal generation circuitry is connected to the command control circuit and is responsive to the directional signal and to the absolute speed signal for generating a motor current modulation signal. A motor current control means is connected to the acceleration signal generation circuit and is responsive to the motor current modulation signal for applying to the motor means energizing signals indicative of the magnitude and polarity of the motor current modulation signal. Current sampling means are connected to the motor current control means and are responsive to the energizing signals applied to the motor means for generating a sampling signal indicative of the electrical current being applied to the motor means at any given time. A comparison circuit means is connected to the current sampling means and is responsive to the sampling signal indicative of the current applied to the motor means for comparing the sampling signal with a plurality of predetermined signals and generating comparison signals indicative of the comparison therewith. Voltage sampling means are connected to the motor current control means and are responsive to the voltage applied thereto for generating a voltage sampling signal indicative of the voltage applied to the motor means. The acceleration signal generation circuit is further responsive to the comparison signals and to the current sampling and voltage sampling signals for adjusting the magnitude and polarity of the motor current modulation signals.

A method for achieving the advantages of the invention with a self-propelled vehicle having a motor circuit connected thereto comprises the steps of selectively generating acceleration command signals indicative of a desired change in velocity of the self-propelled vehicle and further selectively generating an enable signal wherein energizing signals are applied to the motor circuit only so long as the enable signal is maintained. A positive acceleration signal is generated when acceleration of the vehicle is desired in a forward direction while a negative acceleration signal is generated for desired acceleration in a reverse direction.

In accordance with the invention, the speed control arrangement comprises an interface means having a mechanical structure comprising a tiller handle having a gripping area accessible to an operator wherein the acceleration switch means comprises a plurality of manually operable acceleration switches electrically connected to the circuit means and located on the gripping area. The enable switch means comprises at least one manually operable enable switch electrically connected to the circuit means and also located on the gripping area. The manually operable acceleration switches comprise a first acceleration switch for increasing acceleration of the vehicle in a forward direction and a second acceleration switch operable to decrease acceleration in the forward direction. Further, the enable switch means may comprise a pair of enable switches each located on an opposite surface of the gripping area from the acceleration switches.

BRIEF DESCRIPTION OF THE DRAWING

The invention will now be described with reference to the drawings in which.

DETAILED DESCRIPTION

Figure 1:
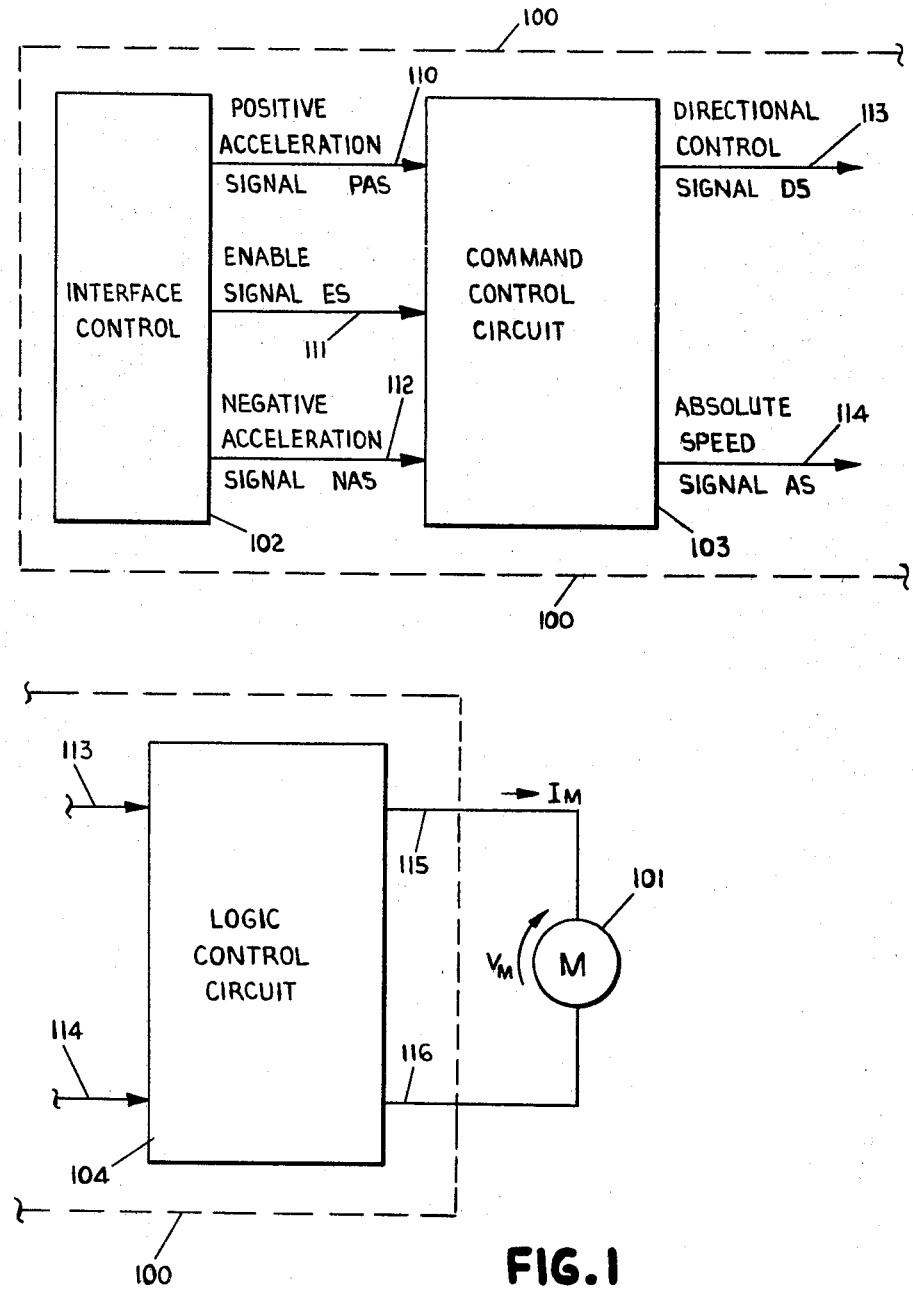
FIG. 1 is a block diagram of one illustrative embodiment of a proportional speed control arrangement in accordance with the invention.

The principles of this invention are disclosed, by way of example, in a proportional speed control arrangement 100 as depicted in block diagram form in FIG. 1. A system of this type may be utilized for speed control of a self-propelled service vehicle such as that generally described and depicted in U.S. Pat. No. 4,020,918, Houskamp et al, issued May 3, 1977. The exemplary speed control arrangement 100 is designed to control the speed and direction of motion, i.e. velocity, of a vehicle via the application of energizing signals to a driving motor apparatus 101 as also shown in FIG. 1. Motor apparatus 101 may comprise any type of motor suitable for establishing motion of the particular vehicle to be driven. For example, a service vehicle, such as the delivery vehicle disclosed in the Houskamp et al patent, may utilize a traction motor apparatus having generally rapid torque response to electrical signals applied thereto. This traction motor apparatus is well known in the art of self-propelled vehicular design. The present invention is independent of any particular motor apparatus and further independent of any particular steering or guidance arrangement associated with the controlled vehicle. The use of the term "direction of motion" in subsequent paragraphs merely refers to the driving motor apparatus as comprising a reversible motor capable of operating in either a "forward" or "reverse" direction.

The proportional speed control arrangement 100 comprises an interface controller 102, a command control circuit 103 and a logic control circuit 104. In accordance with the invention, the interface controller 102 comprises switch elements which are selectively activable by external means. The external means, not depicted in FIG. 1, may comprise either manual operations by a craftperson, i.e. the operator, or any type of automated control circuitry generally known in the art. An embodiment of interface controller 102 in accordance with the invention which may be utilized with manual activation thereof is described in subsequent paragraphs and depicted in FIGS. 5 and 6 of the drawing. For purposes of understanding, further description of the speed control arrangement 100 assumes manual operation of controller 102 by a craftperson. The interface controller 102 is connected to command control circuit 103 via three communication lines 110, 111 and 112 as shown in FIG. 1. When the speed of the associated vehicle is to be increased in a forward direction, certain of the switch elements within controller 102 are activated to generate velocity command signals comprising a positive acceleration signal PAS on communication line 110 and an enable signal ES on communication line 111. When the craftperson desires a reduction in speed in the forward direction and/or an increase in speed in the reverse direction, certain others of the switch elements are activated within interface controller 102 which establishes velocity command signals comprising the enable signal ES on the communication line 111 and a negative acceleration signal NAS on communication line 112 as shown in FIG. 1.

The command control circuit 103 comprises various electrical circuitry subsequently described herein and is responsive to the aforementioned activation of switch elements within the interface controller 102 and the establishment of the aforementioned velocity command signals on communication lines 110 through 112 to generate output signals on communication lines 113 and 114 as shown in FIG. 1. The output signal on communication line 113 is a directional control signal DS which is a bipolar signal having two states comprising a positive polarity and a negative polarity signal level and is indicative of the direction, i.e. forward or reverse, of the velocity of the vehicle. The output signal on communication line 114 is an absolute speed signal designated signal AS as shown in FIG. 1. The absolute speed signal AS is a unipolar analog signal having a level of magnitude corresponding to the speed of the vehicle at any given time.

The directional control signal DS and the absolute speed signal AS are each applied as input signals to logic control circuit 104 as shown in FIG. 1. Logic control circuit 104 comprises electrical circuitry generally known in the art and is responsive to the directional control signal DS and the absolute speed signal AS for applying energizing signals to motor circuit 101. These energizing signals are shown in FIG. 1 and comprise motor current $I_M$ applied through conductors 115 and 116 and motor voltage $V_M$ applied to motor circuit 101 across the conductors 115 and 116. As known to any person skilled in the art of traction motor design, the current $I_M$ is proportional to the torque which is generated by mechanical motion of the traction motor, while voltage $V_M$ is proportional to the velocity of operation of the traction motor. Therefore, the particular magnitudes of current $I_M$ and voltage $V_M$ for specific values of the signals DS and AS are dependent upon external loading of the motor and associated controlled vehicle. However, in accordance with the invention, the actual velocity of the controlled vehicle remains proportional to the signals DS and AS and adjustments to the energizing signals $I_M$ and $V_M$ occur within logic circuit 104. As described in subsequent paragraphs herein, logic circuit 104 can comprise comparison and sampling circuits for executing the aforementioned functions and can further comprise power and relay circuitry for switching velocity direction and for safety control.

Referring again to the signals established on communication lines 110 through 112, the proportional speed control arrangement 100 is operable to adjust velocity of the associated vehicle connected thereto in a manner which provides for a continuum of speeds of the vehicle. As previously described, when the operator requires acceleration in the forward direction, switch elements are activated within the interface controller 102 to establish a positive acceleration signal PAS on communication line 110 and an enable signal ES on communication line 111. Additionally, when the controlled vehicle attains a desired velocity, the operator may control the switch elements of controller in a manner such as to remove the positive acceleration signal PAS while maintaining the enable signal ES on communication line 111. When such control is established, the command control circuit is responsive to the enable signal ES and the removal of the positive acceleration signal PAS to maintain a constant absolute speed signal AS at a value which is substantially equal to the value of the speed signal AS at the time of removal of the positive acceleration signal PAS from communication line 110. Therefore, the operator can easily maintain a desired speed of the vehicle by merely deactivating the switch elements within the interface controller 102 associated with the establishment of the positive acceleration signal PAS, while maintaining activation of switch elements associated with the establishment of the enable signal ES. In a similar manner, when the operator has attained a desired reduced speed in the forward direction, or a desired speed in the reverse direction by means of activation of the switching elements of interface controller 102, that particular speed can be maintained by merely deactivating the switch means associated with establishment of the negative acceleration signal NAS on communication line 112 while maintaining activation of the switch means associated with establishment of enable signal ES on communication line 111. As will be described in subsequent paragraphs, the command control circuit 103 is also operable to establish differing acceleration rates of the vehicle dependent on the desired direction of acceleration and present direction of velocity.

Figure 2:
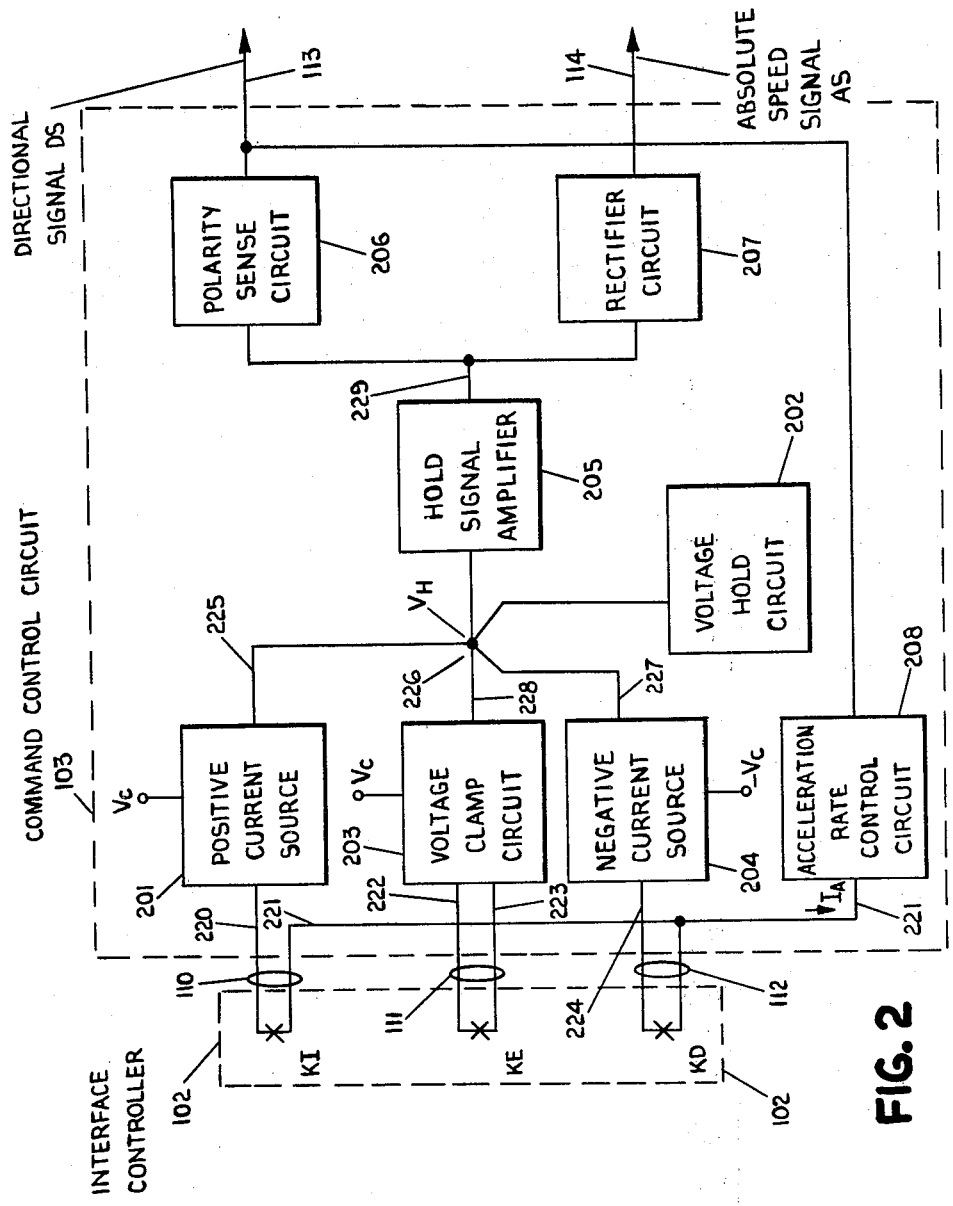
FIG. 2 is a detailed diagram of the interface controller and the command control circuit of the illustrative embodiment shown in FIG. 1.

A more detailed diagram of interface controller 102 and command control circuit 103 is depicted in FIG. 2. As previously described, the interface controller 102 can comprise switching elements which are activated by manual operation. For example, the switching elements can comprise the activable relay contact points KI, KE, and KD as shown in FIG. 2. These relay contact points can be activated by any means suitable for manual operation, such as spring or switch type push-button mechanisms generally known in the art. The relay contact points KI, KE, and KD are shown schematically in FIG. 2 as being "normally open." Accordingly, when the operator activates a mechanism associated with a particular relay contact point, the contact point will "close" and a communication path will be established within the interface controller 102 as shown in FIG. 2. Specifically, when relay contact point KI is activated, a conducting path is established on the pair of conductors 220 and 221 which comprise the previously described communication line 110. The conductor 220 is connected to a positive current source 201 within the command control circuit 103 as shown in FIG. 2. Current source 201 is powered by a supply voltage $V_C$ and can comprise any one of numerous electrical structures well known in the art of circuit design for establishing constant electrical currents. Positive current source 201 is further connected to a voltage hold circuit 202 at a common terminal 226 via a conductor 225. Voltage hold circuit 202 is also well known in the circuit design art and can comprise any circuitry capable of maintaining a voltage signal at terminal 226 without resistive loss for a substantial period of time. For example, hold circuit 202 can comprise a pair of series connected bipolar capacitors. A voltage $V_H$ shown in FIG. 2 at terminal 226 represents the voltage, with respect to a reference potential such as ground potential, across hold circuit 202 at any given time. The current source 201 is structured such that the closure of relay contact point KI and, accordingly, the establishment of a conducting path between conductors 220 and 221, will cause the current source to supply a constant electrical current on conductor 225 in a direction to increase voltage $V_H$ on hold circuit 202. As evident from description in subsequent paragraphs, voltage $V_H$ corresponds proportionally in magnitude and polarity to the velocity of the controlled vehicle. Therefore, relay contact point KI corresponds to a positive acceleration switch means in that closure thereof will cause an increase (in certain situations subsequently explained) in voltage $V_H$ corresponding to vehicular velocity.

Command control circuit 103 further comprises a negative current source 204 which is operative with relay contact point KD in a manner functionally similar to positive current source 201 and relay contact point KI. Specifically, the communication line 112 is connected to contact point KD and comprises conductors 224 and 221 as shown in FIG. 2. Conductor 221 thus comprises a portion of both communication lines 110 and 112. Conductor 224 is directly connected to negative current source 204. Current source 204 utilizes a supply voltage $-V_C$ and is connected to common terminal 226 via conductor 227. Source 204 is structured to establish an electrical current of constant magnitude on conductor 227 when relay contact point KD is activated and a conducting path is established between conductors 224 and 221. The current on conductor 227 is of a direction which decreases the value of voltage $V_H$ on hold circuit 202. Accordingly, electrical signals established on conductors 224 and 221 thus correspond to the negative acceleration signal NAS previously described with respect to FIG. 1. The negative current source 204 can comprise any one of numerous circuit structures well known in the art and similar in design to positive current source 201.

Also as shown in FIG. 2, the communication line 111 comprises a pair of conductors 222 and 223 which are established in a conduction path when the relay contact point KE is closed. Relay contact point KE is an enable switch element and the current existing on communication line 111 when closure occurs corresponds to the previously described enable signal ES as described with respect to FIG. 1. Each of conductors 222 and 223 are connected to a voltage clamp circuit 203 within the command control circuit 103. The clamp circuit 203 has a voltage source $V_C$ acting as a supply voltage thereto and is connected to the common terminal 226 via conductor 228. When contact point KE is "open," i.e. deactivated, clamp circuit 203 comprises an extremely low impedance path through which hold circuit 202 can discharge via conductor 228 such that voltage $V_H$ will be held at (or discharged to) a value substantially equal to zero. Further, with contact point KE deactivated, current through either of conductors 225 or 227 due to respective activation of either contact point KI or contact point KD will not affect voltage $V_H$ since such current will merely flow through the low impedance path comprising conductor 228. With relay contact point KE activated, clamp circuit 203 will comprise a substantially infinite impedance path through conductor 228. Therefore, current through either of conductors 225 or 227 will flow through hold circuit 202 and directly affect the value of voltage $V_H$. It should also be noted that when contact point KI is deactivated, positive current source 201 comprises an open conducting path with respect to conductor 225. Similarly, deactivation of contact point KD causes negative current source 204 to comprise an open conducting path with respect to conductor 227. Accordingly, activation of contact point KE with corresponding deactivation of contact points KI and KD will cause voltage $V_H$ on hold circuit 202 to be maintained at a level attained by prior activation of either of contact points KI or KD.

To exemplify the operation of the command control circuit 103 for maintaining a desired voltage $V_H$ of voltage hold circuit 202, assume that both the relay contact points KI and KE are activated. With these relay contact points in a closed position, the positive current source 201 is supplying current to the voltage hold circuit 202 via conductor 225, thereby increasing the magnitude of voltage $V_H$. If the operator then deactivates the relay contact point KI while maintaining the activation of relay contact point KE, the clamp circuit 203 is operable to maintain the voltage $V_H$ at substantially the level at which it existed at the time relay contact point KI was opened. Subsequent deactivation of contact point KE will cause hold circuit 202 to discharge such that voltage $V_H$ will decrease to a value substantially equal to zero. Operation of contact points KD and KE will provide functions similar to those previously described but with corresponding activations of these contact points causing a decrease in the level of voltage $V_H$. Accordingly, with voltage $V_H$ corresponding to velocity of the controlled vehicle as will be subsequently described, the contact points KI and KD may be functionally described as acceleration switch elements and contact point KE is an "enable" switch element. More specifically, contact point KI is a positive acceleration switch element which, when activated in correspondence to activation of enable switch element KE, provides a positive rate of change of the level of voltage $V_H$. Similarly, contact point KD is a negative acceleration switch element providing a negative rate of change of the level of voltage $V_H$ when correspondingly activated with enable switch element KE.

Each of the current sources 201 and 204, the clamp circuit 203, and the voltage hold circuit 202 are well-known in the art and may comprise any of numerous circuit configurations. It should be noted, however, that if a substantially constant rate of change of voltage $V_H$ is desired when either of contact points KI or Kd is activated in conjunction with contact point KE, the current sources 201 and 204 should be designed for constant current generation. Further, the hold circuit 202 should have minimal resistive losses to prevent leakage of voltage $V_H$ and substantial exponential transient components thereof. Such design considerations are within the knowledge of persons of ordinary skill in the art of circuit design. Additionally, it will be evident to one skilled in the pertinent art that means other than relay contact points KI, KE and KD may be utilized to accomplish the previously described functions with respect thereto.

The voltage signal $V_H$ appearing at common terminal 226 is applied as an input signal to a hold signal amplifier circuit 205 as shown in FIG. 2. The hold signal amplifier circuit 205 is well-known in the art and provides for signal level translation and isolation between the voltage hold circuit 202 and other circuitry of the command control circuit 203 subsequently described herein. Amplifier circuit 205 generates an output signal on conductor 229 which directly corresponds to voltage signal $V_H$ but with the aforementioned level translation and isolation characteristics. This output signal is applied as an input signal to both polarity sense circuit 206 and rectifier circuit 207 via conductor 229 as shown in FIG. 2.

The polarity sense circuit 206 is responsive to the signal on conductor 229 to generate the directional signal DS on conductor 113 depicted within FIG. 1. Directional signal DS is a bipolar DC signal having first and second states. When the signal on conductor 229 is of a positive polarity, corresponding to voltage $V_H$ being of a positive polarity, directional signal DS is in a first state which comprises a constant positive CD level voltage. When $V_H$ is of a negative polarity, signal DS is generated in a second state comprising a constant negative DC level voltage. With voltage $V_H$ corresponding to the instantaneous velocity of the controlled vehicle, the polarity of signal DS is indicative of the instantaneous direction of motion of the vehicle. In the embodiment of the invention described herein, the first and second states of signal DS correspond to forward and reverse directions of motion, respectively. Polarity sense circuit 206 may comprise any one of numerous circuit configurations generally known in the art for converting an analog input signal to a bipolar DC output signal indicative of input signal polarity.

The output signal of amplifier 205 via conductor 229 is also applied as an input signal to rectifier circuit 207 as shown in FIG. 2. Rectifier circuit 207 is responsive to this input signal for generating the absolute speed signal AS on conductor 114 previously described in FIG. 1. This resultant speed signal AS is a unipolar analog voltage having a magnitude directly proportional to the magnitude of voltage $V_H$. Accordingly, the speed signal AS is representative of the instantaneous magnitude of the velocity of the controlled vehicle. Rectifier circuit 207 can comprise any circuit configuration generally known in the art for converting a bipolar analog input signal to a unipolar output signal having a corresponding magnitude.

The command control circuit 103 further comprises an additional element designated an acceleration rate control circuit 208 as depicted in FIG. 2. Rate control circuit 208 is utilized to provide differing magnitudes of acceleration dependent upon the relationship between the present direction of velocity of the vehicle and the present direction of acceleration. As previously described, the magnitudes of currents through the conductors 225 and 227 proportionally correspond to the rate of change of voltage signal $V_H$ when relay contact point KE is activated. Since $V_H$ represents vehicular velocity, these currents in conductors 225 and 227 represent acceleration rates. Further, positive current source 201 is configured such that a current is established through conductors 220 and 221 proportionally corresponding to the current on conductor 225 when relay contact point KI is activated. In a similar manner with respect to negative current source 204, the current through conductors 224 and 221 is proportional to the current on conductor 227 when relay contact point KD is activated. Accordingly, the current through conductor 221, shown as current $I_4$ in FIG. 2, is proportional to the rate at which $V_H$ is increased or decreased and thus corresponds to the rate of vehicular acceleration.

The acceleration rate control circuit 208 is directly connected to conductor 221 and to the polarity sense circuit 206 via conductor 113. Rate circuit 208 is responsive to the state of directional signal DS and to the direction of flow of current $I_4$ through conductor 221 to affect the magnitude thereof. Accordingly, the rate of vehicular acceleration is controlled in part by circuit 208.

To illustrate the operation of acceleration rate control circuit 208, the vehicle is assumed presently in motion in the forward direction, corresponding to a positive polarity directional signal DS. If the operator now desires positive acceleration, i.e. acceleration in the forward direction, relay contact point KI is now activated in correspondence with contact point KE. Acceleration control circuit 208 will control the current $I_A$ through conductor 221 to provide for a constant rate of change of voltage $V_H$ corresponding to a constant positive acceleration $A_P$. However, if relay contact point KD had instead been activated, indicating the operator's desire to decrease acceleration in the forward direction, i.e. negative acceleration, the rate control circuit 208 will control current $I_A$ to provide for a constant negative acceleration $A_N$. $A_N$ may have a differing magnitude than positive acceleration $A_P$. As the vehicle is presently moving in a forward direction, the negative acceleration $A_N$ will cause the vehicle to reduce its absolute speed. When the speed of the vehicle is reduced to zero, the directional signal DS will change polarity. The acceleration control circuit 208 is responsive to this change of polarity in directional signal DS to provide for a different acceleration rate $A_N'$. The purpose of providing for differing acceleration rates dependent upon the present direction of the vehicle is to allow "deceleration" at a faster rate than occurs when acceleration is taking place. For example, the negative acceleration $A_N$ may have a magnitude which is substantially equal to twice that of the negative acceleration $A_N'$ or positive acceleration $A_P$. Thus, with the vehicle moving in a forward direction, and the operator desiring a "slowing down" of the vehicle and a reversal of the direction of velocity, the vehicle would slow to a speed of zero at a rate which is substantially equal to twice that of the rate at which it will accelerate in the negative direction once the zero speed is attained.

Figure 3:
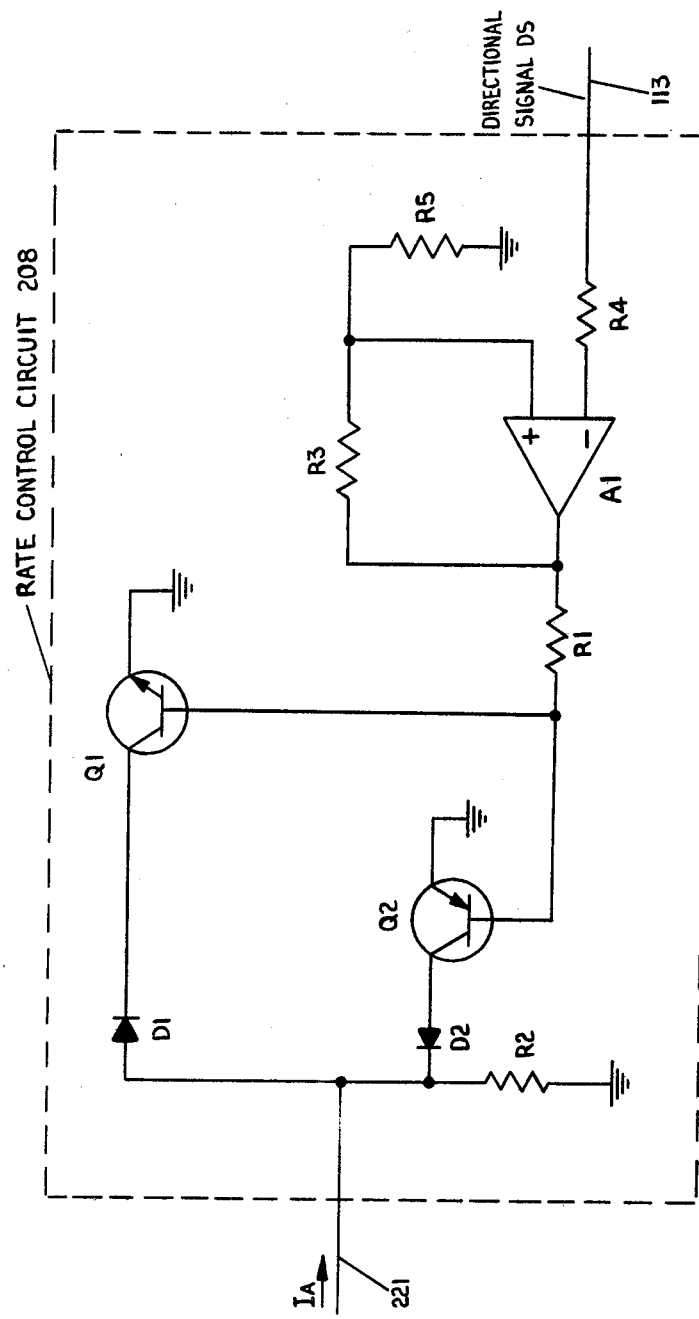
FIG. 3 is a detailed schematic diagram of an illustrative embodiment of an acceleration rate control circuit shown in FIG. 2.

FIG. 3 depicts an acceleration rate control circuit 208 in accordance with the invention which may be utilized with the illustrative embodiment of a command control circuit 103 as shown in FIG. 2. As shown in FIG. 3, the acceleration control circuit 208 comprises an npn transistor Q1 having its emitter connected to ground and further having its collector connected to the cathode of a diode D1. The anode of diode D1 is connected to the conductor 221 depicted in FIG. 2. Similarly, a pnp transistor Q2 has its emitter connected to ground and its collector connected to the anode of a diode D2 which has its cathode also connected to conductor 221. Conductor 221 is further connected to ground through a resistance R2. Each of the base junctions of transistors Q1 and Q2 are connected at a common terminal and are jointly connected to the output of differential amplifier A1 through resistor R1. The conductor 229, previously depicted in FIG. 2, is connected to the negative input of a differential amplifier A1 through a resistance R4. The output terminal of amplifier A1 is connected back to its positive input terminal through a resistance R3. The positive input terminal of differential amplifier A1 is also connected to ground through a resistance R5.

The feedback circuitry comprising the resistances R3 and R5 comprise hysteresis circuitry for the differential amplifier A1 and are well-known in the art. The resistance R4 comprises an impedance isolation element between the output of the polarity sense circuit 206 previously described with respect to FIG. 2 and the differential amplifier A1. Further, resistance R4 reduces the current applied to the negative terminal of differential amplifier A1. The signal at the output of differential amplifier A1 operates as a switching signal which is applied to the bases of transistors Q1 and Q2 through the resistance R1. For example, if the directional control signal DS is of a positive polarity, then the output signal appearing at the output of differential amplifier A1 is of a negative polarity and causes transistor Q1 to be "off" and transistor Q2 to be "saturated." If the current $I_A$ on conductor 221 is in a positive direction as shown, then the input impedance of circuit 208 to current $I_A$ comprises resistance R2. However, if the directional control signal DS is of a negative polarity, then the output signal of differential amplifier A1 will cause transistor Q2 to be off and transistor Q1 to be saturated, thereby providing a direct path from conductor 221 to ground through diode D1 and transistor Q1. If the current $I_A$ is of a positive polarity, the resistance R2 will not be within the conducting path as the current will merely flow through the diode D1 and transistor Q1 to ground.

In the aforedescribed manner, the acceleration rate control circuit 208 as depicted in FIG. 3 operates as a switch to establish within the conducting path of current $I_A$ either the resistance R2 or a direct connection to ground. With the vehicle having a forward direction of velocity corresponding to a positive polarity directional signal DS and a positive acceleration, current $I_A$ will flow through resistance R2. Resistance R2 will also be in the conducting path if the vehicle has a reverse direction of velocity and a negative acceleration. If the direction of velocity is opposite to the direction of acceleration, R2 will be effectively removed from the conducting path of current $I_A$. Thus, in the previously described exemplary operation, $A_P = A_N'$, and $A_P$ is less than $A_N$.

Each of the elements of rate control circuit 208 is well known in the art of circuit design. The resistance R1 is chosen to provide the correct amount of base current to establish transistors Q1 and Q2 in the saturation or cutoff regions as required. Further, the resistance R2 is chosen in combination with other circuit elements of the command control circuit 103 to provide the correct amount of reduction in current $I_A$ for requisite control thereof. Transistors Q1 and Q2 and diodes D1 and D2 can be any of numerous commercially available elements. Resistances R3, R4 and R5 can be chosen in accordance with the particular differential amplifier A1 to be utilized.

Figure 4:
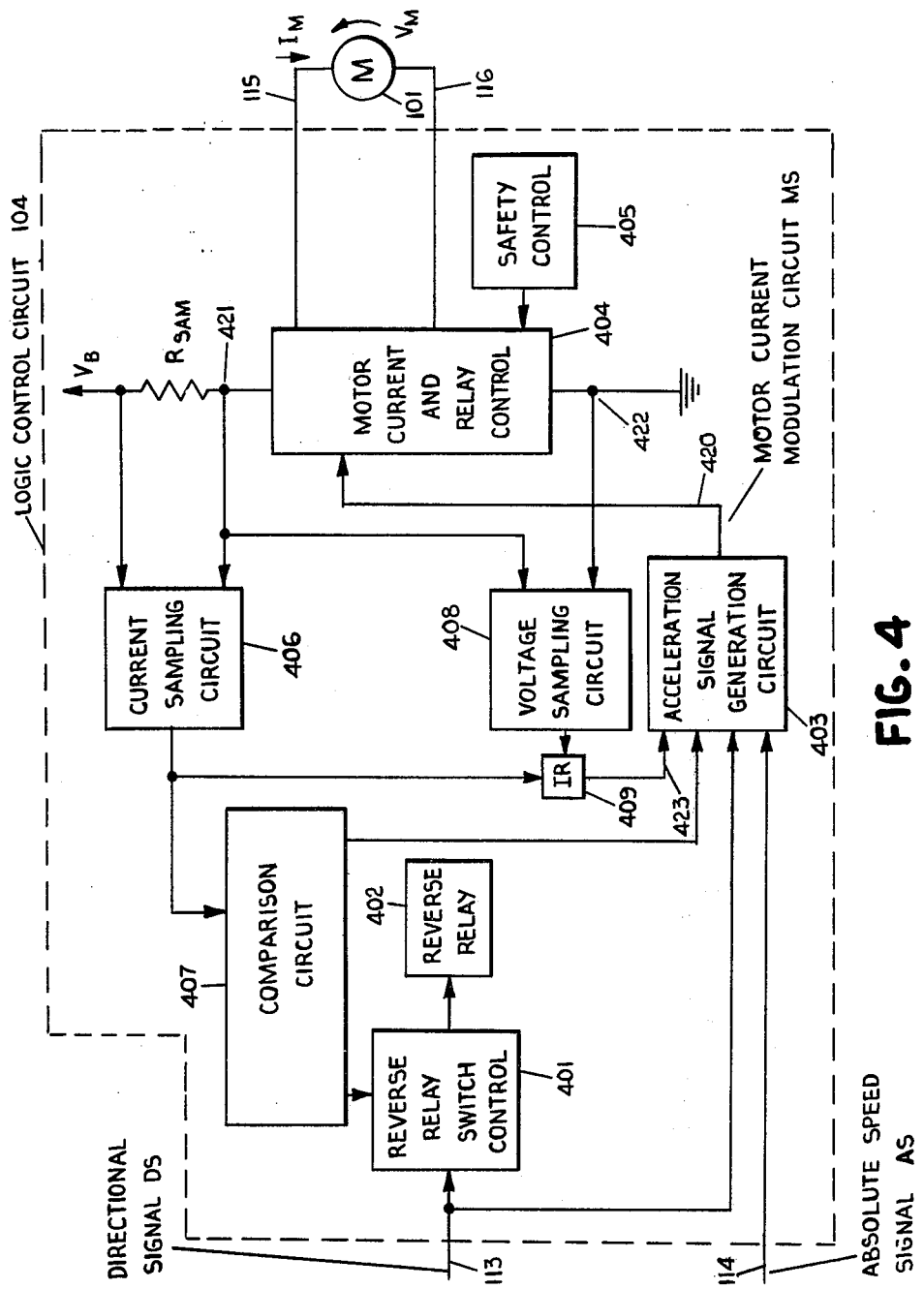
FIG. 4 is a block diagram of the logic control circuit and motor apparatus of the illustrative embodiment shown in FIG. 1.

FIG. 4 depicts in detail the logic control circuit 104 shown in FIG. 1 as connected to the motor circuit apparatus 101 via conductors 115 and 116. All of the circuitry of logic control 104 subsequently described with respect to FIG. 4 is well known in the art of motor control circuit design. The directional signal DS on conductor 229 as previously described with respect to FIG. 2 is applied as an input signal to a reverse relay switch control circuit 401 as shown in FIG. 4. The reverse relay switch control circuit 401 is responsive to the directional signal DS for generating an output signal which is applied to a reverse relay circuit 402. This output signal will cause the reverse relay circuit 402 to operate relay contact points in control circuit 404 which will reverse the direction of motor current $I_M$ when directional signal DS changes state. Accordingly, the motor circuit 101 will reverse the direction of velocity of the controlled vehicle. The directional signal DS is also applied as an input signal to the acceleration signal generation circuit 403 also shown in FIG. 4. The acceleration signal generation circuit 403 is responsive to the directional signal DS and other input signals subsequently described herein to generate an output signal shown as motor current modulation signal MS on conductor 420. The acceleration signal generation circuit 403 also has, as one of its input signals, the absolute speed signal AS on conductor 114 previously described with respect to FIG. 2. Modulation signal MS is a power signal of requisite strength for the motor circuit 101 to establish vehicular motion corresponding to values of directional signal DS and absolute speed signal AS.

The modulation signal MS is directly applied to the motor current and relay control circuit 404 as shown in FIG. 4. The motor current and relay control circuit 404 is utilized to provide the motor current $I_M$ and motor voltage $V_M$ to the motor circuit 101. The current and relay control circuit 404 comprises various circuit elements well-known in the art and specifically comprises relay circuitry which provides for the ability to reverse the current $I_M$ within motor circuit 101 to generate motion of the vehicle under control of motor circuit 101 in either a forward or reverse direction. This relay control circuitry is responsive to operation of the previously described reverse relay circuit 402 to execute this function.

As with numerous motor circuits well known in the art, the current $I_M$ which is applied through motor circuit 101 is proportional to the generated torque, and the voltage $V_M$ across the motor circuit 101 is proportional to the velocity of the motor. The motor current and relay control circuit 404 is connected to a battery source $V_B$ through a sampling resistor $R_{SAM}$ as shown in FIG. 4. The current and relay control circuit 404 can also comprise safety relay circuitry which is operable by the safety control circuit 405 shown in FIG. 4. The utilization of safety relay circuitry in motor control systems is well known in the art and the safety control circuit 405 may comprise any one of numerous conventional safety relay and control circuits. The current which flows through the sampling resistor $R_{SAM}$ is the motor current $I_M$ and therefore the voltage across the sampling resistor is directly proportional to the applied torque of motor circuit 101 at any given time. The motor current $I_M$ is proportionally sampled by monitoring the voltage across the sampling resistor $R_{SAM}$ with current sampling circuit 406 as shown in FIG. 4. The current sampling circuit 406 can be any conventional circuitry which will generate an analog output signal proportional to the current through the sampling resistor $R_{SAM}$. This output signal is applied as an input signal to comparison circuit 407 also shown in FIG. 4. Comparison circuit 407 provides a means for comparing the present current flowing through motor circuit 101 with various selected fixed values which are indicative of electrical and mechanical characteristics of motor circuit 101. For example, comparison elements within comparison circuit 407 can compare the sampled motor current $I_M$ with values indicative of safe operation ranges when reversing direction of motion via reverse relay control circuit 404. To accomplish this comparison, circuit 407 compares the sampled current with a fixed value and applies an output signal to the reverse relay switch control circuit 401 to allow a switching signal to relay circuit 402 only when such reversal can safely occur. Additionally, the comparison circuit 407 compares the sampled current with other values, such as current rating of the specific motor utilized in motor circuit 101 and applies signals to the acceleration signal generation circuit 403 to modulate the magnitude of modulation signal MS.

The voltage across the motor circuit 101, i.e. voltage $V_M$, is also sampled and utilized to adjust modulation signal MS. To accomplish this function, the voltage $V_M$ is sampled by means of the voltage sampling circuit 408 shown in FIG. 4. The voltage between terminals 421 and 422 (ground terminal) across control circuit 404 is proportional to motor voltage $V_M$. The voltage sampling circuit 408 generates an analog output signal which is combined in IR circuit 409 with the analog output signal generated by current sampling circuit 406 to provide what is known as an "IR compensated" proportional output signal on conductor 423. This output signal is proportional to the sumation of the sampled current $I_M$ and voltage $V_M$ and is applied as an input signal to the acceleration signal generation circuit 403 as shown in FIG. 4. Accordingly, the motor current modulation signal MS may be monitored and modulated in response to specific combinational changes in both the current $I_M$ through the motor circuit 101 and the voltage $V_M$ across the motor circuit 101.

As previously described, logic control circuit 104 comprises circuitry well known in the art of motor control design. Further, numerous other configurations of logic control circuit 104 can be utilized in accordance with the invention. Such control circuits must be capable of operating motor apparatus in a manner whereby velocity of a controlled vehicle as established by the motor apparatus corresponds to the polarity of directional voltage signal DS and the magnitude of absolute speed voltage signal AS.

Figure 5:
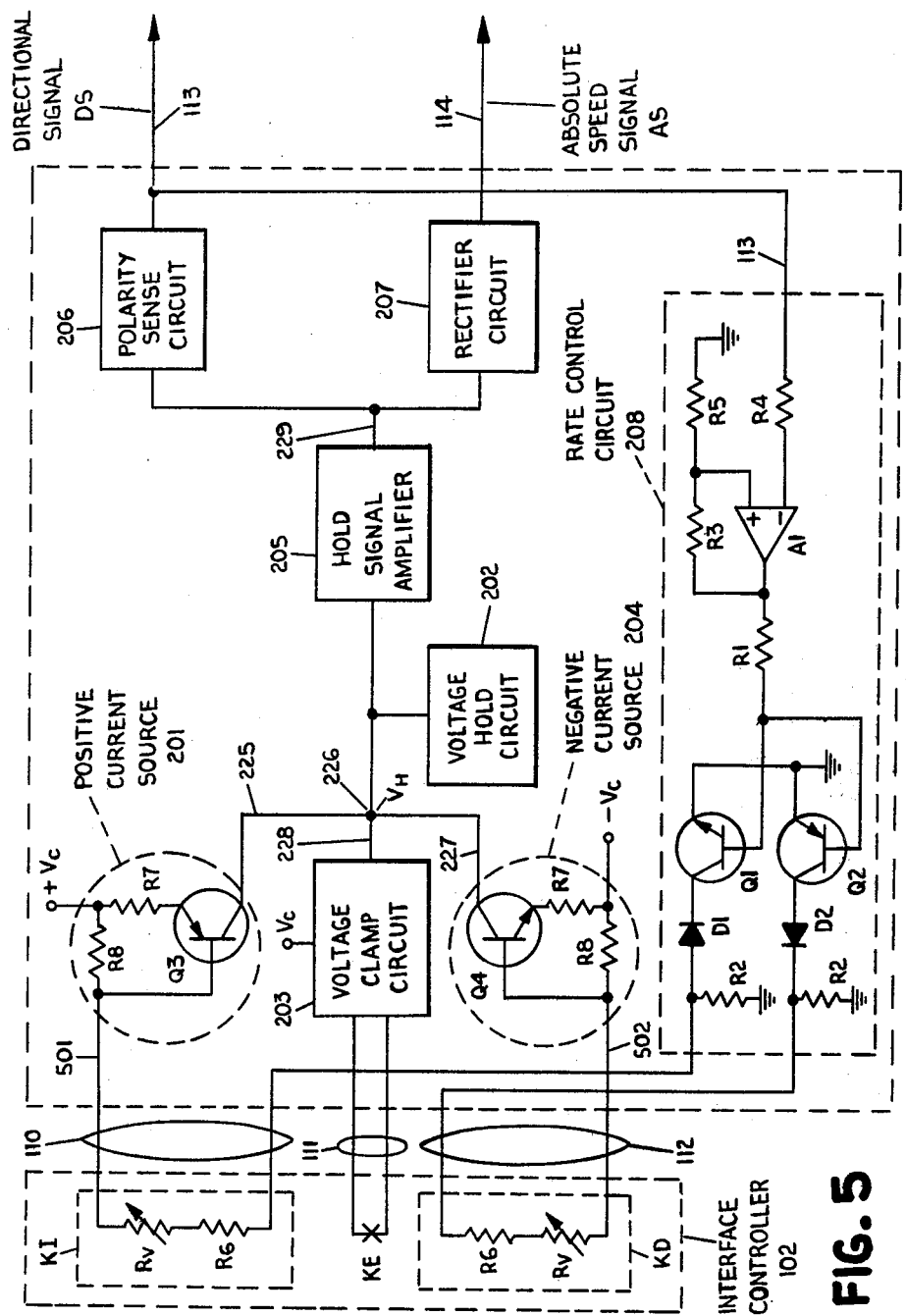
FIG. 5 is a detailed diagram of a further illustrative embodiment of an interface controller and command control circuit in accordance with the invention.

FIG. 5 depicts a further illustrative embodiment of interface controller 102 and command control circuit 103 in accordance with the invention. This embodiment differs from that depicted in FIG. 2 and previously described herein in that FIG. 5 depicts circuitry wherein the rate at which the velocity of the controlled vehicle is modified, i.e. the acceleration, is dependent on the force applied to the switches KI and KD via external means. As previously described, the acceleration rate of the embodiment depicted in FIG. 2 is constant upon activation of either of switches KI or KD, except for the provision of two acceleration rates provided by rate control circuit 208.

The circuit elements in FIG. 5 which function in a substantially identical manner to those elements shown in FIG. 2 are numbered equivalently. As shown in FIG. 5, each of switches KI and KD of interface controller 102 can be electrically modeled as a series combination of a fixed resistance R6 and a variable resistance $R_V$. The switches KI and KD operate such that the values of resistances $R_V$ vary inversely in accordance with the external mechanical force applied thereto. The aforementioned modeling and operation is representative of force sensitive elements such as elastomers in which the "bulk" resistance (resistance from any one point in the elastomer to any other point) decreases when mechanical force is applied. Elastomers and the representative electrical modeling depicted herein are well known in the art of electromechanical circuit design.

One terminal of the variable resistance $R_V$ of positive acceleration switch KI is connected to the base of pnp transistor Q3 in control circuit 103 via conductor 501 as shown in FIG. 5. The circuitry shown in FIG. 5 comprising transistor Q3, resistances R7, R8, and positive voltage source $+V_C$ represents a detailed embodiment of a positive current source which can also be utilized for positive current source 201 shown in FIG. 2. Similarly, one terminal of variable resistance $R_V$ of negative acceleration switch KD is connected via conductor 502 to the base of npn transistor Q4 which operates in combination with its associated resistances R7, R8 and negative voltage source $-V_C$ to provide a negative current source 204 which may also be utilized in the embodiment depicted in FIG. 2. As previously described, the current source operation of circuits 201 and 204 is well known in the art.

To distinguish the operation of the embodiment shown in FIG. 5 from that depicted in FIG. 2, it should be remembered that the currents on conductors 225 and 227 operate to modify the voltage $V_H$ at terminal 226. Voltage $V_H$ representative of the velocity of the controlled vehicle. Thus, the magnitude of the aforementioned currents determine the rate of change of the vehicle velocity, i.e. acceleration rate. In the embodiment depicted in FIG. 2, activation of switch KI or KD provided a constant magnitude current on conductor 225 or 227, respectively. However, in the embodiment depicted in FIG. 5, the magnitude of the current on conductor 225 is inversely dependent on the value of variable resistance $R_V$ in switch KI. Accordingly, if resistance $R_V$ in switch KI varies inversely in accordance with applied force to switch KI, the acceleration rate of the controlled vehicle increases with increased applied force. The negative acceleration switch KD operates in a similar manner, i.e. increased applied force thereto will increase the magnitude of current on conductor 227, thereby increasing negative acceleration.

Also shown in FIG. 5 are connections of switches KI and KD to acceleration rate control circuit 208, identical in function to the rate control circuit 208 depicted in FIGS. 2 and 3 and previously described herein. Accordingly, though acceleration switches in accordance with switches KI and KD depicted in FIG. 5 provide a certain range of acceleration rates in either forward or reverse directions, the rate control circuit 208 provides two levels of ranges of acceleration rates dependent upon the relationship between the desired direction of acceleration and the present direction of velocity as previously described herein.

The values of the various resistances shown in FIG. 5 can be chosen in accordance with required circuit performance as would be obvious to one skilled in the art. Resistances R8 provide a low impedance path for the small currents existing in their respective paths when the associated vairable resistance $R_V$ is in a high impedance condition (low applied force), thus assuring that the associated transistor Q3 or Q4 remains in a non-conducting state when required. Resistances R6 provide limitation of currents when the associated variable resistance $R_V$ is in a low impedance condition (high applied force), thereby limiting transistor base voltage and collector current to safe levels.

Other circuit elements shown in FIG. 5 are numbered equivalent to like elements shown in FIGS. 2 and 3 and provide substantially identical functions therewith. Description of these element is not repeated herein.

It should be noted that other embodiments of interface and command control circuiry may be designed in accordance with the invention. For example, certain types of piezoelectric devices well known in the art may be utilized in conjunction with well known operational amplifiers to provide current or voltage sources having outputs proportional to applied forces. Various other circuit designs in accordance with the invention may be accomplished utilizing other electromechanical elements well known in the art. Further, the acceleration switches KI and KD depicted in FIG. 5 need not be distinct and separate force sensitive devices. A bidirectional force sensitive electromechanical device can be utilized to provide the totality of functions provided by switches KI and KD.

Figure 6:
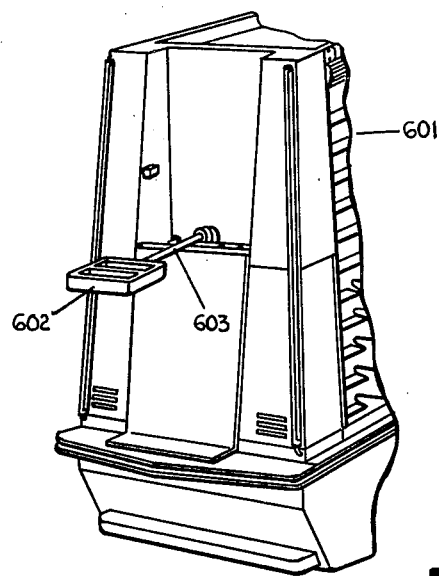
FIG. 6 is a prospective view partially illustrating a vehicle and showing the interface controller shown in FIG. 1 mounted thereon.

As previously described with respect to FIGS. 1 and 2, the interface controller 102 comprises switching means which are capable of generating positive and negative acceleration signals PAS and NAS, respectively, and an enable signal ES as previously described herein. Also as previously described, the switching means for generating these signals can be activated by means of manual operation or further by means of some type of automated control circuit. A mechanical structure for implementing the switching functions of interface controller 102 is depicted in perspective in FIG. 6. FIG. 6 depicts the utilization of a control "handle" 602 for implementing the previously described functions of interface controller 102 for use with a manually operable control vehicle 601 as disclosed in the Houskamp et al patent. Control handle 602 is mechanically connected to vehicle 601 via a tiller structure 603. Tiller structure 603 comprises electrical connections between handle 602 and vehicle 601 to apply electrical signals to motor apparatus contained in the vehicle. These signals are applied in response to manual operation of switches on handle 602.

Figure 7:
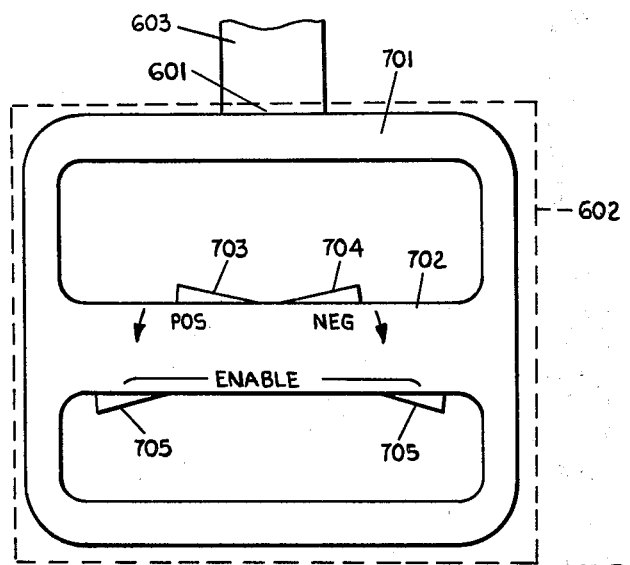
FIG. 7 is a plan view of the handle structure of the interface controller shown in FIG. 6.

FIG. 7 depicts the mechanical structure of the control handle in a more detailed diagram. The control handle 602 is connected to the vehicle via the tiller structure 603 and comprises electrical conductors capable of establishing the acceleration signals and enable signal previously described with respect to FIG. 2. The handle 602 comprises a ring structure 701 which has a central gripping area 702 as shown in FIG. 7. The gripping area 702 is positioned within the ring 701 such that an operator can utilize the gripping structure 702 via either a right or left hand. On one surface of the gripping area 702 are a positive acceleration switch 703 and a negative acceleration switch 704 specifically as shown in FIG. 7. The positive acceleration switch 703 is operable via manual control to activate the relay contact point KI in interface controller 102 previously described with respect to FIGS. 2 and 5. Similarly, the negative acceleration switch 704 is operable via manual control to activate the relay contact point KD also described with respect to FIGS. 2 and 5. The opposite surface of the gripping area 702 comprises enabling control switches 705 as shown in FIG. 7. The enabling control switches 705 are operable via manual control to activate the relay contact point KE described with respect to FIG. 2 in the interface controller 102. The arrangement of the acceleration control switches 703 and 704, and the enabling switches 705 on the central gripping area 702 as depicted in FIG. 7 enables ease of manual operation of the proportional speed control arrangement previously described herein regardless of whether the operator is a right-handed or left-handed person.

The principles of the invention are not limited to a specific motorized arrangement for controlling specific types of vehicles. The proportional speed control arrangement may be used in any configuration requiring directional acceleration control via utilization of either manual or automated operation. It will be apparent to those skilled in the art that modifications and variations of the abovedescribed illustrative embodiment of the invention may be effected without departing from the spirit and scope of the novel concepts of the invention.

The embodiments of the invention in which an exclusive property or privilege is claimed are defined as follows:

1. A proportional speed control arrangement (100) for adjusting and maintaining velocity of a self-propelled vehicle having motor means (101) for applying energy to said vehicle and establishing motion thereof, said speed control arrangement (100) comprising:
    interface means (102) selectively activable for establishing velocity command signals indicative of desired directional motion of said vehicle;
    circuit means (103, 104) connected to said interface means (102) and to said motor means (101) and responsive to activation of said interface means (102) and to said velocity command signals for applying to said motor means (101) energizing signals for adjusting the velocity of said vehicle from a first velocity to a second velocity; characterized in that
    said interface means (102) comprises acceleration switch means (KI) and enable switch means (KE) wherein said velocity of said vehicle is adjusted from said first velocity to said second velocity by activation of both said acceleration switch means (KI) and said enable switch means (KE); and
    said velocity of said vehicle is substantially maintained at said second velocity by deactivation of said acceleration switch means (KI) at a time corresponding to the time of said vehicle substantially attaining said second velocity.

2. A proportional speed control arrangement (100) in accordance with claim 1 characterized in that said circuit means (103, 104) is responsive to said velocity command signals only upon activation of said enable switch means (KE).

3. A proportional speed control arrangement (100) in accordance with claim 1 characterized in that said motor means (101) is responsive to deactivation of said enable switch means (KE) to adjust the magnitude of said velocity of said vehicle to a value substantially equal to zero.

4. A proportional speed control arrangement (100) in accordance with claim 1 characterized in that said acceleration switch means (KI) comprises:
    positive acceleration switch means (KI) connected to said circuit means (103, 104) and selectively activable for establishing acceleration of said vehicle in a forward direction; and
    negative acceleration switch means (KD) connected to said circuit means (103, 104) and selectively activable for establishing acceleration of said vehicle in a reverse direction.

5. A proportional speed control arrangement (100) in accordance with claim 4 characterized in that activation of said positive acceleration switch means (KI) will establish acceleration of said vehicle in a forward direction only upon corresponding activation of said enable switch means (KE).

6. A proportional speed control arrangement (100) in accordance with claim 4 characterized in that said negative acceleration switch means (KD) will establish acceleration of said vehicle in a reverse direction only upon corresponding activation of said enable switch means (KE).

7. A proportional speed control arrangement (100) in accordance with claim 4 characterized in that said velocity command signals comprise a positive acceleration signal and a negative acceleration signal wherein said positive acceleration switch means (KI) is responsive to activation thereof for establishing said positive acceleration signal and said negative acceleration switch means (KD) is responsive to activation thereof for establishing said negative acceleration signal.

8. A proportional speed control arrangement (100) in accordance with claim 7 characterized in that said positive acceleration signal has a magnitude dependent upon the magnitude of a force applied to said positive acceleration switch means (KI) and said negative acceleration signal has a magnitude dependent upon the magnitude of a force applied to said negative acceleration switch means (KD).

9. A proportional speed control arrangement (100) in accordance with claim 8 characterized in that said positive acceleration switch means (KI) and said negative acceleration switch means (KD) comprise elastomer devices.

10. A proportional speed control arrangement (100) in accordance with claim 8 characterized in that said positive acceleration switch means (KI) and said negative acceleration switch means (KD) comprise a bidirectional force sensing device.

11. A proportional speed control arrangement (100) in accordance with claim 7 characterized in that said velocity command signals further comprise an enable signal wherein said enable switch means (KE) is responsive to activation thereof for establishing said enable signal.

12. A proportional speed control arrangement (100) in accordance with claim 1 or claim 11 characterized in that said circuit means (103, 104) comprises:
    a command control circuit (103) connected to said interface means (102) and responsive to establishment of said velocity command signals for generating a directional signal and an absolute speed signal;
    logic circuit means (104) connected to said command control circuit (103) and to said motor means (101) and responsive to said directional signal and to said absolute speed signal for applying said energizing signals to said motor means (101);
    said directional signal having first and second states wherein said directional signal is established in said first state when said velocity of said vehicle is in a forward direction and said directional signal is established in said second state when said velocity of said vehicle is in a reverse direction; and
    said absolute speed signal is a continuum signal having a magnitude corresponding to the magnitude of said velocity of said vehicle.

13. A proportional speed control arrangement (100) in accordance with claim 12 characterized in that said logic circuit means (104) comprises:
    a relay switch control circuit (401) connected to said command control circuit (103) and responsive to the state of said directional signal for generating a relay control signal;
    reverse relay means (402) connected to said relay switch control circuit (401) and responsive to said relay switch control signal for operating relays to reverse the polarity of said energizing signals thereby reversing the direction of motion of said motor means (101);

acceleration signal generation circuitry (403) connected to said command control circuit (103) and responsive to said directional signal and to said absolute speed signal for generating a motor current modulation signal;

motor current control means (404) connected to said acceleration signal generation circuitry (403) and responsive to said motor current modulation signal for applying to said motor means said energizing signals wherein said energizing signals are indicative of the magnitude and polarity of said motor current modulation signal;

current sampling means (406) connected to said motor current control means (404) and responsive to said energizing signals applied to said motor means (101) for generating a sampling signal indicative of the electrical current being applied to said motor means (101);

comparison circuit means (407) connected to said current sampling means (406) and responsive to said sampling signal indicative of the current applied to said motor means (101) for comparing said sampling signal with a plurality of predetermined signals and generating comparison signals indicative of said comparison therewith;

voltage sampling means (408) connected to said motor current control means (404) and responsive to the voltage applied to said motor means (101) for generating a voltage sampling signal indicative thereof; and said acceleration signal generation circuit (403) is further responsive to said comparison signals and to said current sampling and voltage sampling signals for adjusting the magnitude and polarity of said motor current modulation signal.

14. A proportional speed control arrangement (100) in accordance with claim 1 or claim 11 characterized in that said circuit means (103, 104) comprises:

a command control circuit (103) connected to said interface means (102) and responsive to establishment of said velocity command signals for generating a directional signal having first and second states wherein said directional signal is established in said first state when said velocity of said vehicle is in a forward direction and said directional signal is established in said second state when said velocity of said vehicle is in a reverse direction;

said command control circuit (103) is further responsive to establishment of said velocity command signals for generating an absolute speed signal indicative of the desired speed of said vehicle; and said command control circuit (103) comprises acceleration control means (208) connected to said interface means (102) and responsive to the state of said directional signal and to the activation of either of said positive acceleration switch means (KI) and negative acceleration switch means (KD) to adjust the rate of change of said absolute speed signal.

15. A proportional speed control arrangement (100) in accordance with claim 14 characterized in that said acceleration control means (208) is responsive to activation of said positive acceleration swtich means (KI) and to said directional signal being in said first state for adjusting the rate of change of said absolute speed signal to a first predetermined rate; and said acceleration control means (208) is further responsive to activation of said negative acceleration switch means (KD) and to said directional signal being in said first state to adjust the rate of change of said absolute speed signal to a second predetermined rate wherein said second predetermined rate is greater in magnitude than said first predetermined rate.

16. A proportional speed control arrangement (100) in accordance with claim 14 characterized in that said acceleration control means (208) is responsive to activation of said negative acceleration switch means (KD) and to said directional signal being in said second state for adjusting the rate of change of said absolute speed signal to a first predetermined rate; and said acceleration control means (208) is responsive to activation of said positive acceleration switch means (KI) and to said directional signal being in said second state to adjust the rate of change of said absolute speed signal to a second predetermined rate wherein said second predetermined rate is greater in magnitude than said first predetermined rate.

17. A proportional speed control arrangement (100) in accordance with claim 14 characterized in that said acceleration control means (208) comprises:

a conducting path connecting to said acceleration switch means (KI, KD);

circuit switch means (Q1, Q2) connected to said conducting path for selectively controlling the magnitude of impedance in said conducting path; and differential means (A1) connected to said circuit switch means (Q1, Q2) and responsive to said directional signal for applying control signals to said circuit switch means (Q1, Q2) indicative of the state of said directional signal.

18. A proportional speed control arrangement (100) in accordance with claim 17 characterized in that said circuit switch means (Q1, Q2) is responsive to activation of said positive acceleration switch means (KI) and to said directional signal being in said first state for establishing the impedance of said conducting path at a first predetermined impedance; and said circuit switch means (Q1, Q2) is further responsive to activation of said positive acceleration switch means (KI) and to said directional signal being in said second state for establishing the magnitude of impedance in said conducting path to a second predetermined impedance wherein said second predetermined impedance is greater in magnitude than said first predetermined impedance.

19. A proportional speed control arrangement (100) in accordance with claim 14 characterized in that said command control circuit (103) comprises:

a positive current source (201) connected to said positive acceleration switch means (KI) and responsive to activation of said positive acceleration switch means (KI) for generating a electrical current corresponding to said positive acceleration signal;

a negative current source (204) connected to said negative acceleration switch means (KD) and responsive to activation of said negative acceleration switch means (KD) for generating an electrical current corresponding to said negative acceleration signal;

a voltage hold circuit (202) connected to said positive current source (201) and to said negative current source (204) and responsive to each of said positive acceleration signal and negative acceleration signal to adjust a holding voltage indicative of the desired velocity of said vehicle;

a voltage clamp circuit (203) connected to said enable switch means (116) and to said voltage hold circuit (202) and responsive to activation of said enable switch means (KE) to allow said holding voltage to change in the presence of a corresponding activation of said acceleration switch means (KI) and further responsive to the absence of a corresponding activation of said acceleration switch means (KI) to maintain said holding voltage;

a polarity sense circuit (206) connected to said voltage hold circuit (202) and responsive to said holding voltage for generating said directional signal wherein said directional signal is indicative of the polarity of said holding voltage; and a rectification circuit (207) connected to said voltage hold circuit (202) and responsive to the magnitude of said holding voltage to generate said absolute speed signal wherein said absolute speed signal corresponds to the magnitude of said holding voltage.

20. A proportional speed control arrangement (100) in accordance with claim 1 characterized in that said interface means (102) comprises a manually operable handle (602) having a gripping area (702) accessible to an operator wherein said acceleration switch means (KI) comprises a first acceleration switch (703) electrically connected to said circuit means (103, 104) and located on said gripping area (702) and said enable switch means (KE) comprises at least one manually operable enable switch (705) electrically connected to said circuit means (103, 104) and located on said gripping area (702).

21. A proportional speed control arrangement (100) in accordance with claim 20 characterized in that interface means further comprises a second acceleration switch (704) wherein each of said acceleration switches (703, 704) is located on a first surface of said gripping area (702) and wherein said first acceleration switch (703) is manually operable to increase acceleration of said vehicle in a forward direction and said second acceleration switch (704) is manually operable to decrease acceleration in the forward direction; and said enable switch means (KE) comprises a pair of enable switches (705) each located on a surface of said gripping area (702) opposite from said first surface.

22. A proportional speed control arrangement (100) in accordance with claim 21 characterized in that said first and second acceleration switches (703, 704) are force sensitive switches and are manually operable to respectively increase and decrease acceleration of said vehicle at a rate dependent upon the manual force applied to said first and second acceleration switches (703, 704).

23. A proportional speed control arrangement (100) in accordance with claim 21 characterized in that said interface means (102) further comprises a mechanical ring structure (701) surrounding said gripping area (702) and arranged to leave open spaces on either side of said gripping area (702) comprising sufficient space for an operator to manually control each of said first and second acceleration switches (703, 704) and each of said pair of enable switches (705).

24. A method for controlling the velocity of a self-propelled vehicle having a reversible motor connected thereto, said method comprising the application of energizing signals to said motor for controlling said velocity of said vehicle:

characterized in that said method further comprises:

selectively generating an acceleration command signal indicative of a desired increase in magnitude of velocity of said vehicle;

selectively generating an enable signal; and increasing the magnitude of said velocity of said vehicle and continuing to apply said energizing signals to said motor only so long as said enable signal persists.

25. The method in accordance with claim 24 characterized in that said method further comprises:

generating a positive acceleration signal when acceleration of said vehicle is desired in a forward direction;

adjusting the value of a hold signal in response to said positive acceleration signal wherein said hold signal is representative of said velocity of said vehicle;

generating a directional signal having a polarity indicative of the polarity of said hold signal;

generating an absolute speed signal having a magnitude indicative of the magnitude of said hold signal; and applying said energizing signals to said motor circuit (101) in response to said directional signal and to said absolute speed signal.

26. The method in accordance with claim 25 characterized in that said method further comprises:

detecting the polarity of said directional signal thereby detecting the direction of velocity of said vehicle;

adjusting the rate of change of said hold signal to a first predetermined change rate when the direction of velocity of said vehicle is a forward direction thereby establishing acceleration of said vehicle at a first predetermined acceleration; and adjusting the rate of change of said hold signal to a second predetermined change rate when the direction of velocity of said vehicle is a reverse directional thereby establishing acceleration of said vehicle at a second predetermined acceleration wherein said second predetermined change rate is greater in magnitude than said first predetermined change rate.

* * * * *